United States Patent [19]

Airhart

[11] Patent Number: 4,799,572
[45] Date of Patent: Jan. 24, 1989

[54] AMPHIBIOUS SEISMIC SOURCE
[75] Inventor: Tom P. Airhart, Plano, Tex.
[73] Assignee: Atlantic Richfield Company, Los Angeles, Calif.
[21] Appl. No.: 48,332
[22] Filed: May 11, 1987
[51] Int. Cl.[4] .............................................. G01V 1/04
[52] U.S. Cl. .................................... 181/114; 181/121
[58] Field of Search ................ 73/635; 181/113, 114, 181/117, 118, 119, 120, 121, 401, 402; 367/141, 143, 189, 190

[56] References Cited

U.S. PATENT DOCUMENTS

| 3,394,775 | 7/1968 | Cole et al. | 181/120 |
| 4,284,165 | 8/1981 | Airhart et al. | 181/119 |
| 4,391,299 | 7/1983 | Holmes | 181/120 |
| 4,402,381 | 9/1983 | Airhart | 181/121 X |

FOREIGN PATENT DOCUMENTS 2167859  6/1986  United Kingdom ............... 181/114

Primary Examiner—Brian S. Steinberger
Attorney, Agent, or Firm—F. Lindsey Scott

[57] ABSTRACT

An impulsive seismic generator is mounted on a swamp buggy suitable for operations both in a marshy environment and on land. The generator employs a target plate which may be lowered into a body of water or mud beneath the buggy so as to contact subsurfaces of varying degrees of firmness. The submerged components of the generator are surrounded by a water-tight barrier which isolates the space between a descending mass and the receiving target plate from the surrounding fluid.

9 Claims, 2 Drawing Sheets

AMPHIBIOUS SEISMIC SOURCE

BACKGROUND OF THE INVENTION

1. Field of the Invention

This invention relates generally to the field of geophysical prospecting and more particularly to apparatus for generating seismic waves in the earth adaptable for use in a marshy or wetlands environment.

2. Description of the Prior Art

The transitional area between ground solid enough to support land-based impulsive and vibratory seismic sources and open water of depth sufficient for airguns has long been a challenge for seismic data acquisition. Recently it has become even more so with increased emphasis on natural environment preservation. The present invention is designed to extend the capabilities of existing impulsive sources in order to meet the needs of marsh land operations.

For the purposes of the description of this invention to follow and the appendant claims the terms "marsh land," "swamp," or "marshy environment" are understood to mean, more or less interchangeably, a coastal or other wet flat land covered with water or soft mud wherein vegetation may be really more important than open water and wherein there may be a complete lack of solid foundation. The term "swamp buggy" as used herein and in the claims is intended to refer to an automotive vehicle well known to the art for traveling or navigating over terrain characterized by marsh lands or swamps, and especially, although not limited to, such a vehicle provided with very large tires for flotation and for propulsion and which is suitable for amphibious operation. Finally, the term "fluid" as used herein and in the claims is intended to mean any nongaseous medium ranging in consistency from open water to flowable mud.

The preferred form of the invention to be described, utilizes an impulsive seismic source of the type described generally in U.S. Pat. No. 4,284,165 entitled "Acoustic Pulse Generator" issued on Aug. 18, 1981 to Tom P. Airhart et al, the content of which are incorporated herein by reference. However, as will become apparent from what follows, other forms of impulsive source wherein a mass is propelled against a target member may be employed in constructing and practicing this invention.

The general object of the invention is to provide an improved seismic source for operation in a marshy environment More particularly, the invention has as its object the provision of vehicle mounted apparatus utilizing an impulsive seismic source capable of operations in such an environment.

Other and further objects and advantages of the invention will become apparent from a consideration of the detailed description to follow taken in conjunction with the accompanying drawings and appended claims.

SUMMARY OF THE INVENTION

In accordance with the preferred embodiment, this invention comprises in combination a vehicle capable of operation in a marshy environment, a target plate, lift means secured to the vehicle for raising and lowering the target plate so that it may be positioned for transport or for an impacting operation, an impact mass, and an actuator carried on the vehicle for propelling the mass along a downward path to strike the target plate and for returning the mass to its initial firing position. Resilient means are interposed between the lift means and the target plate so as to allow the target plate limited freedom of movement relative to the lift means against a subsurface medium, whether firm or yieldable, responsive to collision with the impact mass so as to thereby, directly or indirectly, generate a seismic wave. Extensible tubular fluid barrier means are provided having an upper end secured in fixed relation to the vehicle and a lower end secured to the target plate, the barrier being disposed so as to isolate the space between the mass and the target plate from the surrounding fluid environment.

DESCRIPTION OF THE PREFERRED EMBODIMENT

Figure 1:
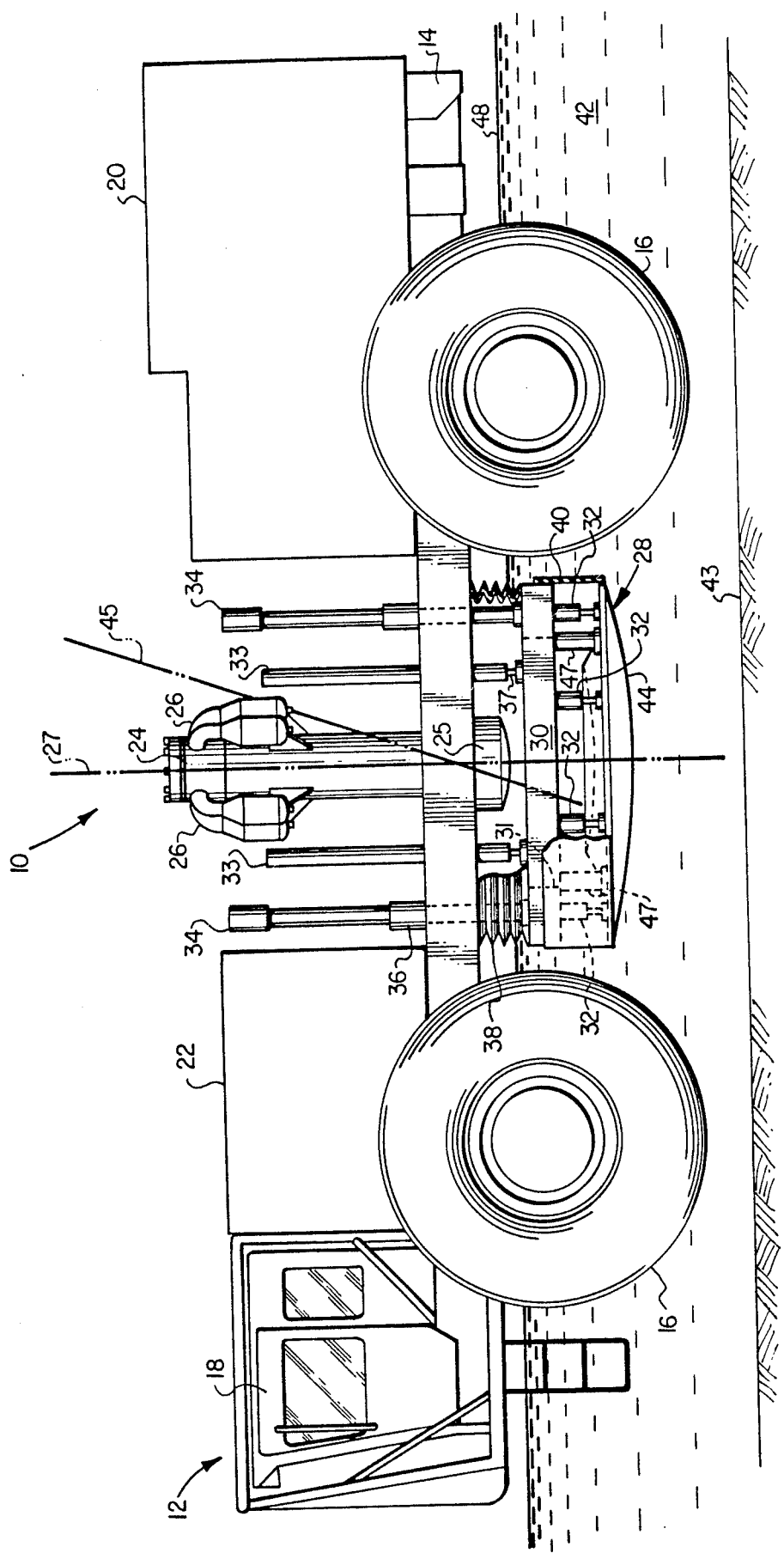
FIG. 1 illustrates in partially schematic form a simplified elevational view of an apparatus in accordance with the preferred embodiment of this invention comprising generally a swamp buggy and an impulsive-type seismic generator carried thereon.

Referring now to FIG. 1 an impulsive seismic source 10 is mounted on a swamp buggy 12 comprising generally a frame 14 supported on large flotation wheels 16, a cab 18, engine section 20, and auxiliary equipment section 22. Source 10 may be of the type described and shown in U.S. Pat. No. 4,284,165 referenced above, the operation of which is well known to the art. Briefly, source 10 comprises a hollow upstanding actuator housing 24 carried on frame 14 and containing a firing tube (not shown) which is adapted to receive and slidably support impact mass 25 in a firing position and direct its path of movement in operation. Air supply vessels 26 are adapted upon the release and gravity induced descent of impact mass 25 to inject compressed air into the firing tube above mass 25 through side ports therein so as to drive mass 25 downwardly along a path 27. Associated with actuator 10 is a target plate 28 for receiving a blow from descending mass 25 and for transferring its energy into surrounding body of fluid 42, or a nonfluid subsurface thereunder, as an acoustic wave. Target plate 28 extends generally in a plane transverse to the downward path 27. Spaced apart from and positioned above target plate 28 is a lift frame 30 generally coextensive therewith. Lift frame is configured to provide a central aperture 31 through which mass 25 may freely travel. A plurality of air cylinder type shock absorbers 32 are interconnected between target plate 28 and lift frame 30 so as to allow limited relative movement between these two members. Lift frame 30 may be raised for transport or lowered for deployment of target plate 28 by means of hydraulic lift cylinders 33 whose upper ends are secured to frame 14 and whose piston rods 37 are secured to lift frame 30. To maintain lateral alignment between target plate and actuator 10, a plurality of upright guide rods 34 are secured to lift frame 30 and extend upwardly there from through sleeves 36 carried on frame 14. Guide rods 34 work within sleeves 36 as lift frame 30 is raised or lowered.

A flexible tubular bellows 38, constructed of rubberized fabric or the like, is secured in suitable fashion between frame 14 and lift frame 30. In like manner a tubular elastomeric member 40, such as a rubber boot, extends between and is adhesively fastened to the peripheries of lift frame 30 and target plate 28. Bellows 38 and boot 40 are designed in combination and secured so as to create a water-tight barrier between the body of fluid 42 navigated by buggy 12 and the space between mass 25 and target plate 28.

Figure 2:
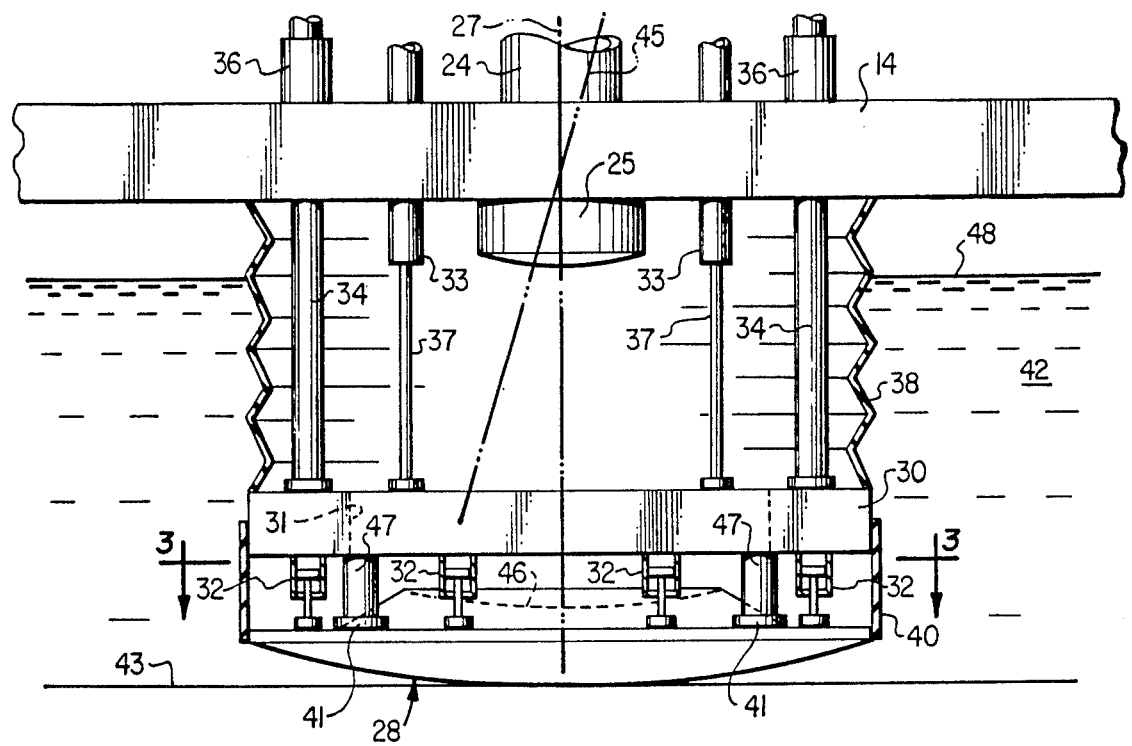
FIG. 2 is a fragmentary elevational view, partially in section, of the generator of FIG. 1 illustrating its target plate deployed for a firing operation.

When target plate 28 is deployed at a predetermined distance beneath mass 25 by downward extension of lift cylinders 33, as best seen in FIG. 2, bellows 38 flexibly extends to accommodate this movement. In operation, actuator 10 is energized to propel mass 25 along path 27 to strike target plate 28. The resultant movement of target plate 28 against the subsurface medium with which it is placed in contact, whether water, mud or, as shown in FIG. 2, solid earth surface 43, generates an acoustic pulse which either directly or indirectly induces seismic waves in the underlying earth structure. Compression of the air in shock absorbers 32 restores target plate 28 to its original position for a succeeding operation. Upward travel of target plate is limited by contact with pads 41 at the lower end of stop bars 47 projecting downwardly from lift frame 30. At the same time, boot 40 stretches to allow the above-described movement of target plate 28.

Swamp buggy 12 is designed to float at a depth such that the surface 44 of fluid body 42 does not rise to the level of frame 14. Thus, attachment of the upper end of bellows 38 to any member which, in operation, lies safely above surface 44 is effective in maintaining a fluid-free space for travel to mass 25.

The typical operation of buggy 12 is as an amphibious vehicle. On land, when target plate 28 is deployed to the prescribed distance, the weight of buggy 12 may be transferred in whole or in part from wheel 16 by extension of lift cylinders 36 operating in the manner of hydraulic jacks. In such case, the earth itself restores target plate 28 to its original position after impact with mass 25. Shock absorbers 32 continue to isolate other components of the system from high frequency shock to which target plate 28 may be subjected. In a marshy environment, the buggy 12 may either float freely or rest on a subsurface depending on the conditions encountered. However, target plate 28 may be deployed to the prescribed depth regardless of such conditions. If a shallow hard bottom is encountered, buggy 12 will be lifted to some extent as on land. Thus, the depth of the fluid body 42, whether relatively open water or of muddy consistency, is not a limiting factor on the operation of the apparatus of this invention. While an amphibious buggy 12 as described is well adapted to use in seismic operations over terrain varying from firm ground to marshy conditions, any vehicle capable of operation in a fluid environment is also usable in the practice of this invention as long as its configuration is such as to accommodate the mounting and deployment of a source 10 target plate 28 and associated components as described. Thus, for example, an air boat or even a towed vessel could be substituted for buggy 12 if desired.

Figure 3:
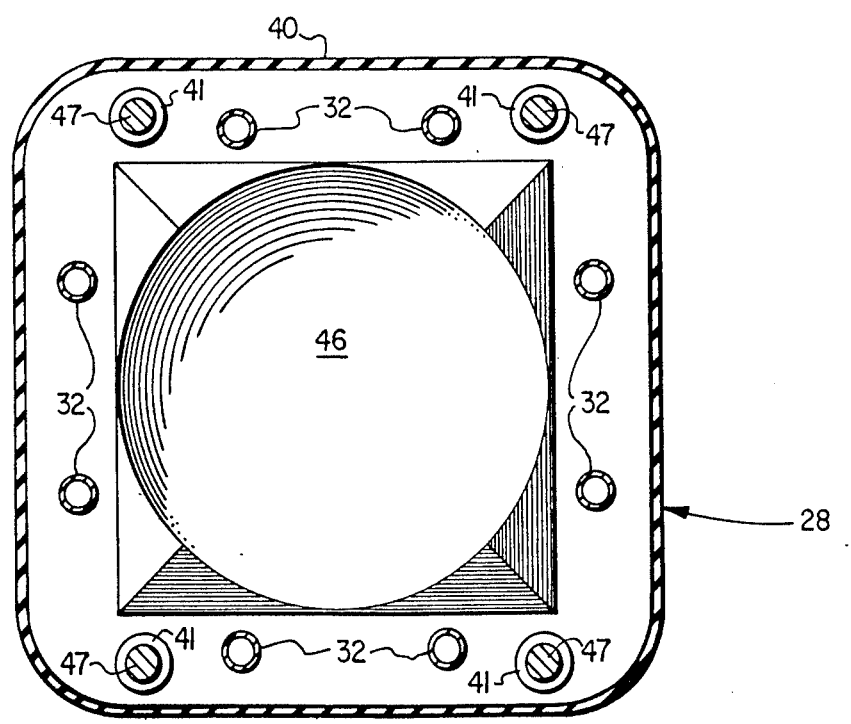
FIG. 3 is a sectional view taken along the line 3—3 of FIG. 2 showing the target plate in plan.

As described thus far, the operation of source 10 causes target plate 28 to move in a generally vertical direction. If the bottom surface of target plate 28, upon deployment, is in contact with a fluid subsurface layer, this direction is not a critical factor since a fluid body will support only compressional waves and not shear waves. However, if a hard subsurface 43 beneath fluid body 42 is encountered by target plate under surface 44 or if buggy 12 is operated on dry ground, then inclination of the axis of source 10 with respect to such subsurface 43 can be used to generate a combination of compressional and shear waves. Thus, it is entirely feasible to impact target plate 28 along a path such as path 45 inclined to the vertical in order to generate such combined compressional and shear waves in a hard subsurface medium. U.S. patent application Ser. No. 06/676,762 entitled "Mounting and Control Means for Full Wave Form Seismic Source" filed Nov. 30, 1984 in the name of Tom P. Airhart now U.S. Pat. No. 4,660,674 teaches apparatus by means of which source 10 may be tilted at any desired angle and azimuth. The contents of this patent application on which the issue fee has been paid, are hereby incorporated by reference. In order to accommodate propulsion of mass 25 along a path 45 inclined to the vertical, target plate 28 may be provided with an upwardly facing concave striker surface 46 as shown in FIGS. 1, 2, and 3. For further versatility, undersurface 44 of target plate 28 may be provided with a convex contour. A purpose for this shape is to accommodate impacts on uneven subsurface layers such as in the vicinity of banks bordering fluid body 42. Cleats on the bottom of plate 28 may be provided for improved lateral ground traction for inclined operation.

It is understood that the preceding description and the accompanying drawings are illustrative only of a preferred embodiment of this invention. Therefore, without departing from the scope of this invention as set forth in the appended claims, those skilled in the art will be able to make many modifications in the configuration and relative position of parts of the apparatus as described and shown.

What is claimed is:

1. Apparatus for generating seismic waves in the earth comprising:
   (a) a transport vehicle adapted for navigation in a fluid environment;
   (b) a target plate;
   (c) a lift means adjustably secured between the vehicle and the target plate for alternately raising the target plate for transport and lowering the target plate to an impact position wherein the target plate is in continuous contact with a desired subsurface of such fluid environment;
   (d) an impact mass;
   (e) actuator means carried on the vehicle in operative engagement with the impact mass for propelling the impact mass from a firing position along a downward path to collide with the target plate in such impact position and for thereafter returning the impact mass to such firing position;
   (f) resilient means interposed between the lift means and the target plate so as to provide limited freedom of movement to the target plate relative to the lift means along the downward path against the subsurface responsive to the collision between the target plate and the impact mass and for limiting upward movement of the target plate with respect to the lift means; and
   (g) extensive fluid-barrier means secured between the vehicle and the target plate so as to isolate the space between the impact mass and the target plate from the fluid environment while accommodating the operation of the lift means and such limited movement of the target plate.

2. Apparatus as in claim 1 wherein the lift means comprises a plurality of downwardly extending hydraulic lift cylinders adjustably interconnected between the vehicle and the target plate through the resilient means.

3. Apparatus as claimed in claim 2 wherein the lift means further comprises a lift frame extending in a plane parallel to and spaced above that of the target-plate, the hydraulic lift cylinders being connected between the vehicle and the lift frame and the resilient means being connected between the lift frame and the target plate.

4. Apparatus as claimed in claim 3 wherein the resilient means comprises a plurality of compressed air shock absorbers.

5. Apparatus as claimed in claim 4, wherein each of the shock absorbers comprises an air-filled cylinder fixed to the lift frame and having a piston secured to the target plate, such that the downward movement of the target plate from its impact position compresses the air in such cylinder.

6. Apparatus as claimed in claim 3, wherein the barrier means comprises:
(a) a flexible, upstanding, tubular bellows secured between the vehicle and the lift frame, and
(b) an elastomeric boot secured between the lift frame and the target plate.

7. Apparatus as claimed in claimed in claim 3, wherein the resilient means includes a plurality of stop bars extending from the lift frame toward the target plate, operable to contact the target plate to limit upward motion of the target plate.

8. Apparatus as claimed in claim 1 wherein the vehicle is a swamp buggy.

9. Apparatus as claimed in claim 8 wherein the swamp buggy is a self-powered amphibious vehicle having at least four wheels adapted alternately for rolling contact with the land surface and for propelling such vehicle through the fluid environment.

* * * * *